(12) United States Patent
Fenimore (10) Patent No.: US 9,990,663 B2
(45) Date of Patent: Jun. 5, 2018

(54) MEASURING SHIRT

(71) Applicant: Ryan Devin Fenimore, Vail, CO (US)

(72) Inventor: Ryan Devin Fenimore, Vail, CO (US)

( * ) Notice: Subject to any disclaimer, the term of this patent is extended or adjusted under 35 U.S.C. 154(b) by 745 days.

(21) Appl. No.: 14/491,146

(22) Filed: Sep. 19, 2014

(65) Prior Publication Data

US 2015/0081468 A1  Mar. 19, 2015

Related U.S. Application Data (60) Provisional application No. 61/879,797, filed on Sep. 19, 2013.

(51) Int. Cl.
  *A41H 1/02*   (2006.01)
  *G06Q 30/06*  (2012.01)
  *A41H 1/10*   (2006.01)

(52) U.S. Cl.
  CPC .......... *G06Q 30/0621* (2013.01); *A41H 1/02* (2013.01); *A41H 1/10* (2013.01); *G06Q 30/0633* (2013.01)

(58) Field of Classification Search
  CPC .................................. A41H 1/02; A41H 1/10
  USPC ......................................... 33/2 R, 1 BB, 512
  See application file for complete search history.

(56) References Cited

U.S. PATENT DOCUMENTS

| | | | | |
|---|---|---|---|---|
| 5,635 A | * | 6/1848 | Lucas | A41H 1/02 33/12 |
| 633,654 A | * | 9/1899 | Melick | A41H 1/02 33/15 |
| 649,988 A | * | 5/1900 | Kohn | A41H 1/02 33/2 R |
| 711,611 A | * | 10/1902 | Adelberg | A41H 1/02 29/428 |
| 1,248,510 A | * | 12/1917 | Levi | A41H 1/02 33/2 R |
| 1,360,327 A | * | 11/1920 | Starer | A41H 1/02 33/11 |
| 1,397,865 A | * | 11/1921 | Hilliard | A41H 1/02 33/15 |
| 2,374,654 A | * | 5/1945 | Cooke | A41H 1/10 33/15 |
| 4,211,011 A | * | 7/1980 | Jacobson | A41H 1/02 33/15 |
| 4,635,367 A | * | 1/1987 | Vigede | A41H 1/02 33/15 |
| 4,868,990 A | * | 9/1989 | Steinberg | A41H 1/10 33/15 |
| 4,885,844 A | | 12/1989 | Chun | |

(Continued)

FOREIGN PATENT DOCUMENTS

KR   10-2002-0006133 A   1/2002

OTHER PUBLICATIONS

International Search Report and Written Opinion dated Dec. 26, 2014 from corresponding International Patent Application No. PCT/US2014/056515; 10 pgs.

*Primary Examiner* — Christopher Fulton
(74) *Attorney, Agent, or Firm* — Maier & Maier, PLLC (57) ABSTRACT

A measuring garment may be provided. The measuring garment may include at least one measurement marking for determining a measurement for a desired garment dimension. The measuring garment may be used to convey calculate and subsequently convey measurement info to a garment company for producing or providing fitted garments.

3 Claims, 10 Drawing Sheets

(56) References Cited

U.S. PATENT DOCUMENTS

| | | | | |
|---|---|---|---|---|
| 5,956,525 A | * | 9/1999 | Minsky | A41H 1/02 33/15 |
| 2002/0166254 A1 | | 11/2002 | Liebermann | |
| 2006/0254067 A1 | | 11/2006 | Abdilla | |
| 2007/0209096 A1 | | 9/2007 | Davis | |

* cited by examiner

MEASURING SHIRT

RELATED APPLICATIONS

This application claims priority to U.S. Provisional Application No. 61/879,797, filed Sep. 19, 2013, the contents of which are herein incorporated by reference.

BACKGROUND

Shopping for clothing that properly fits is a tedious task. Currently, shoppers must go store-to-store to try on several items of clothing in several sizes in order to find clothing that fits to their own personal liking. If a shopper wants to avoid spending time to shop around, a shopper has to bear the expense of buying a piece of clothing then paying extra to have a tailor measure and alter the clothing so that it fits to the shopper's liking. Alternatively, with the increase in online shopping and free shipping, a business may bear the extra expense of shoppers purchasing items and returning them when they do not fit. Even further, a business may incur the expense of shoppers purchasing multiple sizes of the same item, only to return all but the best fitting.

Current clothing sizing methods require an excess of time and expense. The required time and expense is increasingly burdensome if a shopper wants a unique, specified fit for each item of clothing they purchase or want to alter. Additionally, current clothing sizing methods cannot be done individually or in the privacy of one's home.

SUMMARY

According to at least one exemplary embodiment, a measuring shirt may be provided. The measuring shirt may include a torso portion, a right arm portion, a left arm portion, a neck portion, and at least one measurement marking. The at least one measurement marking may be disposed on at least one of the torso portion, the right arm portion, the left arm portion, or the neck portion.

According to another exemplary embodiment, a method of ordering a fitted shirt may be provided. The method may include acquiring a measuring shirt, putting on the measuring shirt, and determining desired measurements using the measuring shirt. The method may further include selecting a shirt for purchasing and providing the desired measurements determined above to the provider of the shirt. The process may be repeated as desired.

In yet a further exemplary embodiment, a method for processing custom measurement garment orders may be provided. The process may include providing a measuring garment, allowing a user to calculate measurement data using the measuring garment, providing a software application for a user computer device, allowing a user to enter measurement data through the software application and allowing the user to order a garment through the software application. The user computer device may further be configured to communicate the measurement data entered through the software application to an order processing computer. The order processing computer may match the user measurement data with a pre-finished or unfinished garment in a company's inventory, or may provide the measurement data to create a new garment. A garment may be completed or selected based on the measurements and payment and shipping information may be processed through data entered by the user through the software application and communicated to the order processing computer.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Figure 1:
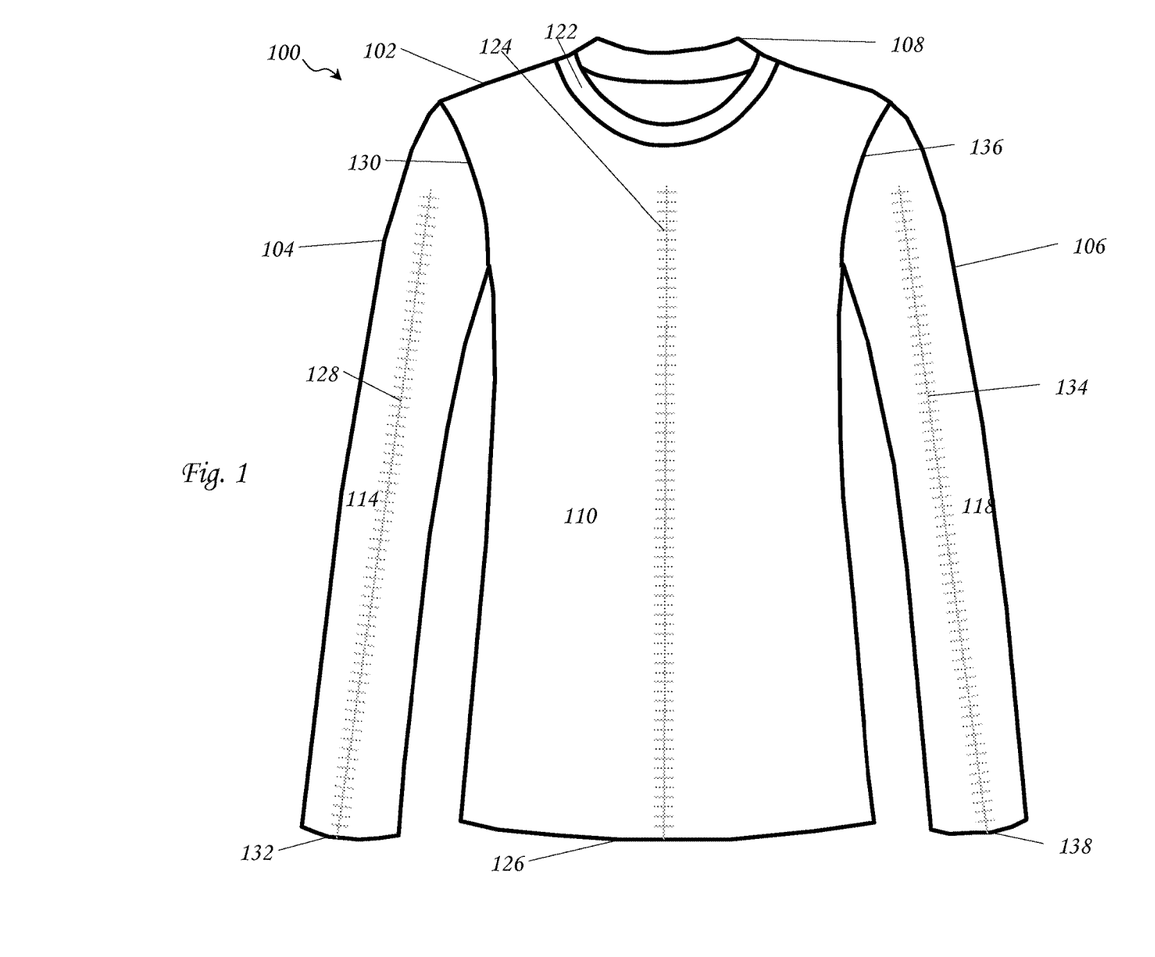
FIG. 1 is an exemplary diagram of a measuring shirt.

According to some exemplary embodiments, a user may utilize a measuring shirt, for example measuring shirt 100, to determine specifically desired measurements that can be used by the user for purchasing new shirts or tailoring shirts the user already owns. A measuring shirt can have a plurality of measurement markings that allow a user to determine specifically desired measurements in a private location such as the user's home, thereby saving the user the time and expense of traveling to shop at stores, trying on several different sizes of shirts while shopping, and going to the tailor to get measurements or shirts altered. Additionally, a measuring shirt can also allow a user to make personal measurements by themselves without the need of a measuring tape. A measuring shirt can be used to determine measurements for any type of clothing that may be worn over a human upper body, for example jackets, coats, vests, sweaters, suit coats, tuxedos, robes, blouses, tank tops, and dresses. A measuring shirt can be made out of any fabric or textile material, as would be understood by a person having ordinary skill in the art.

Also, according to some exemplary embodiments, a plurality of measurement markings included on a measuring shirt may allow a user to determine a plurality of desired measurements, for example quantified measurements of a torso length, a front chest, a back chest, an overarm, a shoulder, a bicep, a forearm, a stomach, a waist, a hip, a neck, a sleeve, and a wrist. Additionally, a plurality of measurement markings included on a measuring shirt may allow a user to determine a general shirt size measurement, for example "small," "medium," "large," "extra large," "short," "regular," "long," and "extra long." Quantified and general shirt size measurements may be submitted online or over the phone to order new shirts or have old shirts resized. Measurement markings may be included on the measuring shirt via any known means such as printing, spraying, adhering, stitching, or sewing measurement markings onto the measuring shirt. The measuring shirt can allow a user to record the plurality of measurements to reflect their personal preference for the fit of the specific shirt for which the user makes the measurements. For example, an individual user can use the same measuring shirt to record measurements for a loose-fitting athletic shirt and a form-fitting formalwear shirt. A measuring garment with measurement markings may also be applied to lower body clothing such as pants, footwear such as shoes, handwear such as gloves, and headwear such as hats.

Figure 2:
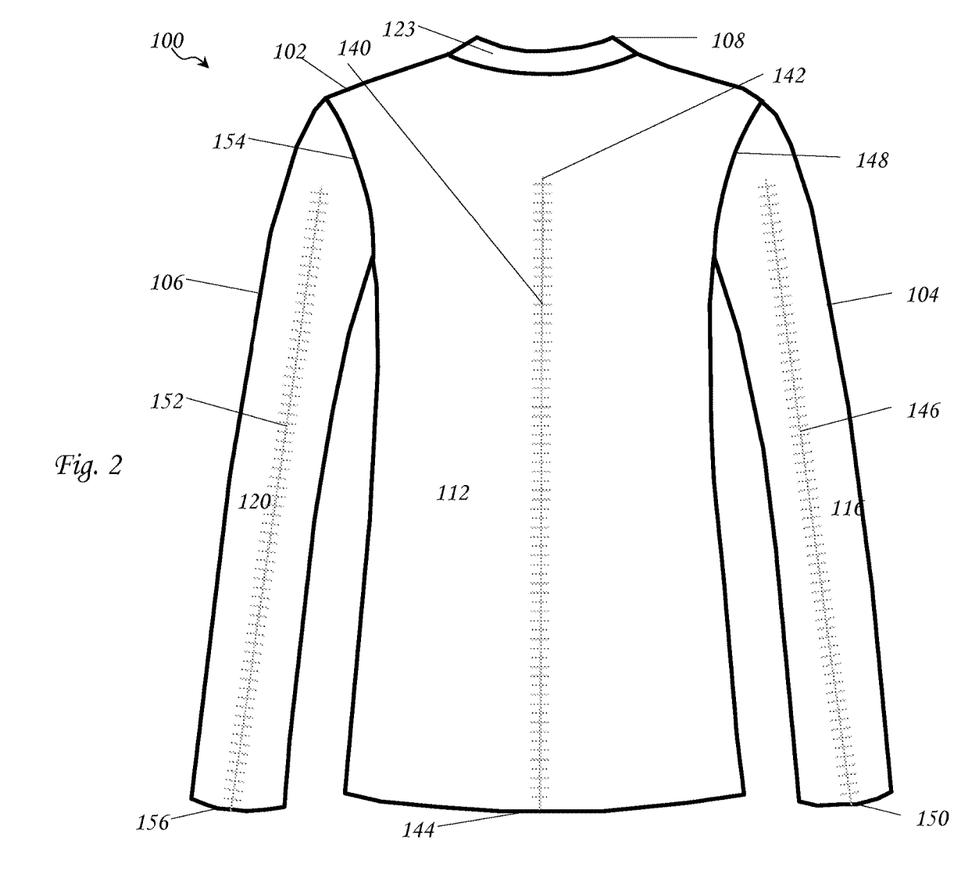
FIG. 2 is an exemplary diagram of a measuring shirt.

Referring now to exemplary FIGS. 1 and 2, an exemplary embodiment of a measuring shirt such as measuring shirt 100 may be shown. Measuring shirt 100 may include a torso 102, a right sleeve 104, a left sleeve 106 and a neck 108. The torso 102 may include a front torso 110 and a back torso 112. The right sleeve 104 may include a front right sleeve 114 and a back right sleeve 116. The left sleeve 106 may include a front left sleeve 118 and a back left sleeve 120. The neck 108 may include a front neck 122 and a back neck 123. The torso 102, right sleeve 104, and left sleeve 106 of the measuring shirt can be sized such that very large users may still be able to determine measurements for loose-fitting, "baggy" shirts. In some alternative embodiments, measuring shirts may come in multiple sizes, each accommodating measurements for a range of similarly sized users.

As shown in exemplary FIG. 1, the front torso 110 may have at least a front torso length measurement marking 124. A first front torso measurement marking 124 may start at or near the front neck 122 and end at a front torso bottom edge 126 of the front torso 110. The front right sleeve 114 can have at least a first front right sleeve measurement marking 128. The first front right sleeve measurement marking 128 can start at or near a front right shoulder 130 and end at a front right sleeve bottom edge 132. The front left sleeve 118 can have at least a first front left sleeve measurement marking 134. The first front left sleeve measurement marking 134 can start at or near a front left shoulder 136 and end at a front left sleeve bottom edge 138.

As shown in exemplary FIG. 2, the back torso 112 may have at least a back torso length measurement marking 140. A first back torso measurement marking 142 can start at or near the back neck 123 and end at a back torso bottom edge 144 of the back torso 112. The back right sleeve 116 can have at least a first back right sleeve measurement marking 146. The first back right sleeve measurement marking 146 can start at or near a back right shoulder 148 and end at a back right sleeve bottom edge 150. The back left sleeve 120 can have at least a first back left sleeve measurement marking 152. The first back left sleeve measurement marking 152 can start at or near a back left shoulder 154 and end at a back left sleeve bottom edge 156.

Figure 3:
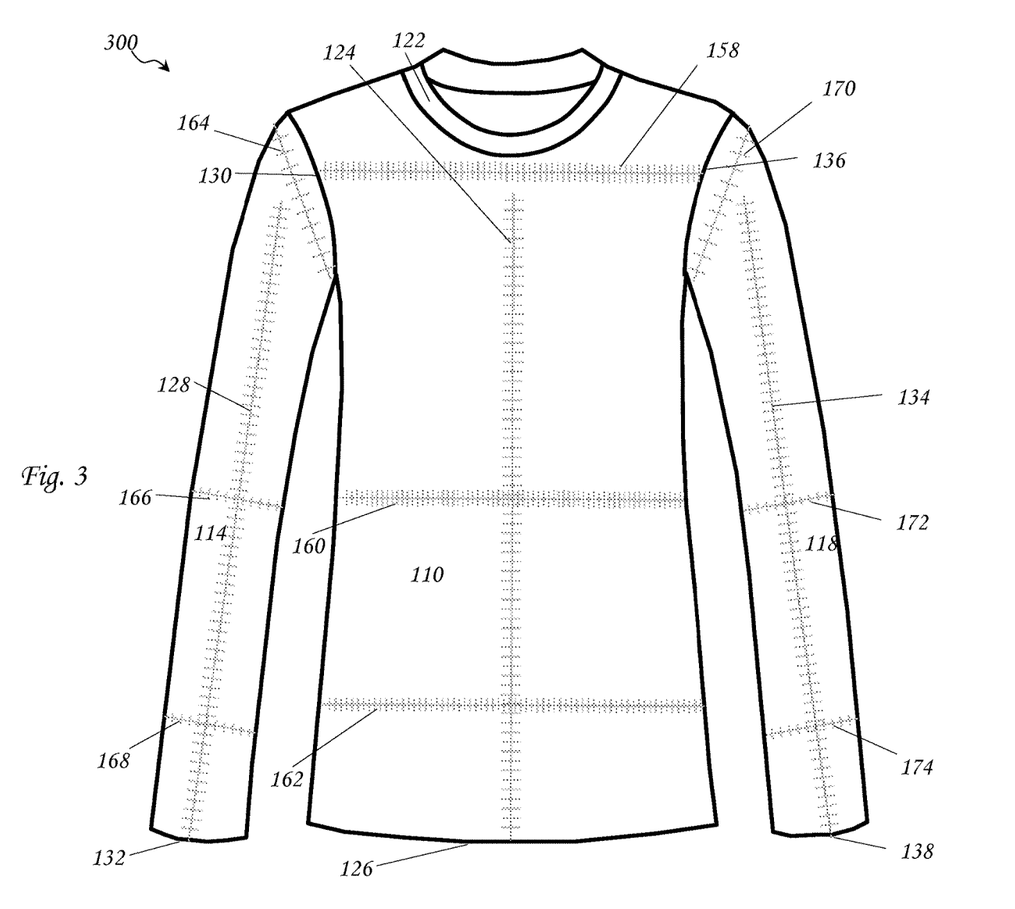
FIG. 3 is an exemplary diagram of a measuring shirt.
Figure 4:
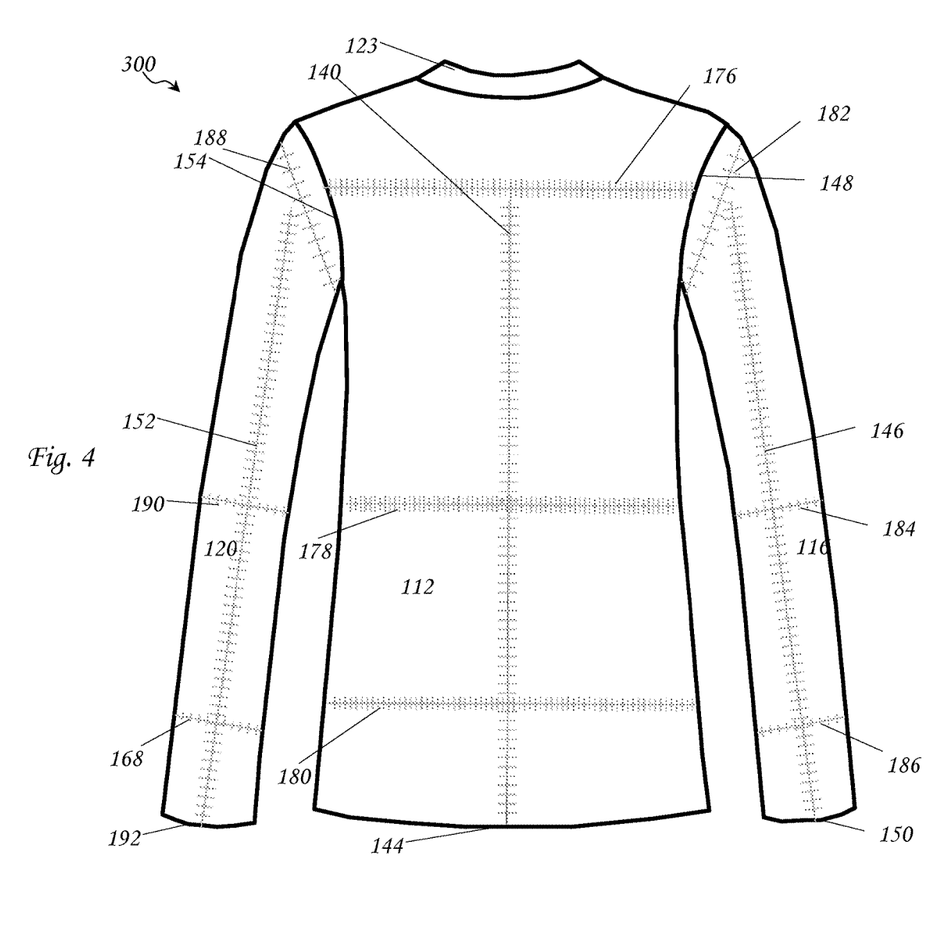
FIG. 4 is an exemplary diagram of a measuring shirt.

Referring now to exemplary FIGS. 3 and 4, an exemplary embodiment of a measuring shirt such as measuring shirt 300 may be shown. Measuring shirt 300 can include more measurement markings in addition to the first front torso measurement marking 124, the first front right sleeve measurement marking 128, the first front left sleeve measurement marking 134, the back torso length measurement marking 140, the first back right sleeve measurement marking 146, and the first back left sleeve measurement marking 152. For example, as may be shown in exemplary FIG. 3, the measuring shirt 300 may include at least a first front chest measurement marking 158, a first front stomach measurement marking 160, a first front waist measurement marking 162, a first front right bicep measurement marking 164, a first front right forearm measurement marking 166, a first front right wrist measurement marking 168, a first front left bicep measurement marking 170, a first front left forearm measurement marking 172, and a first front left wrist measurement marking 174. Additionally, for example, as may be shown in FIG. 4, the measuring shirt 300 may include at least a first back chest measurement marking 176, a first back stomach measurement marking 178, a first back waist measurement marking 180, a first back right bicep measurement marking 182, a first back right forearm measurement marking 184, a first back right wrist measurement marking 186, a first back left bicep measurement marking 188, a first back left forearm measurement marking 190, and a first back left wrist measurement marking 192. Front and back measurement markings may be configured to form a single measurement marking Therefore, for example, a front and back bicep measurement marking may be configured to form a single circumferential measurement scale.

Figure 5:
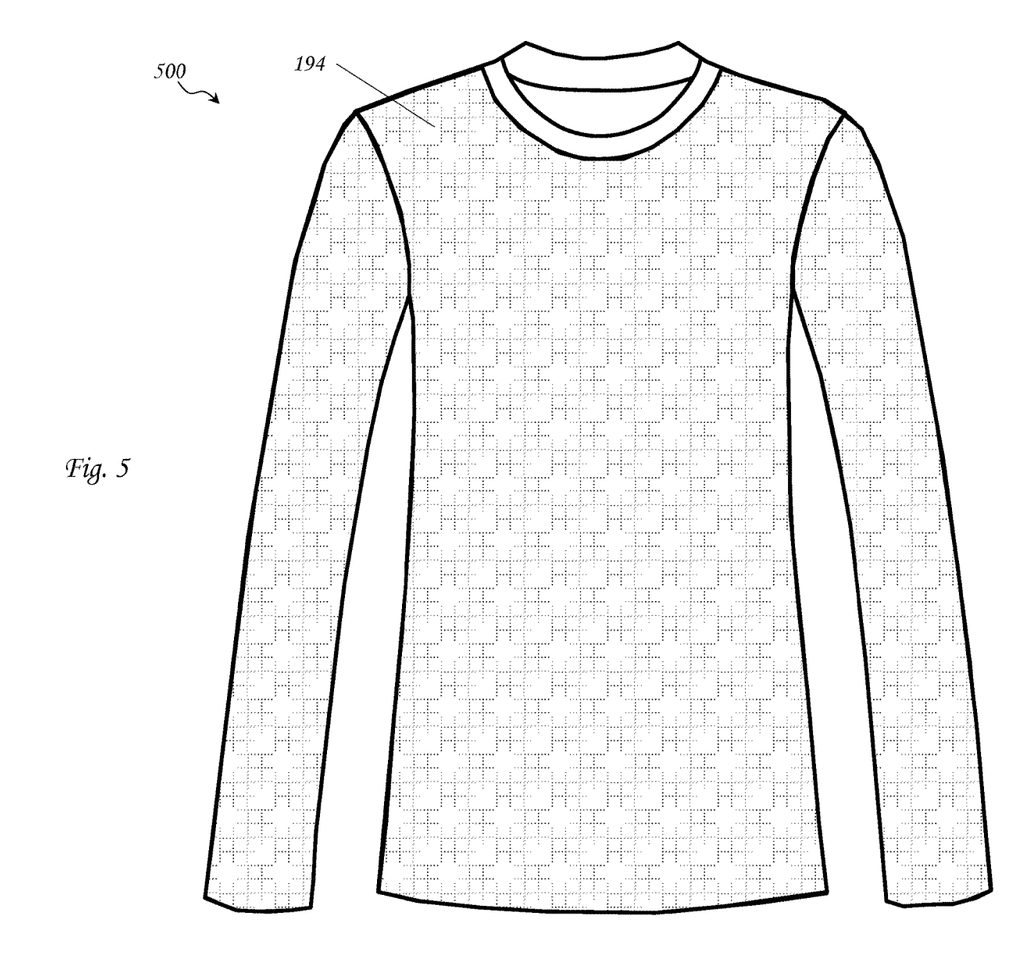
FIG. 5 is an exemplary diagram of a measuring shirt.
Figure 6:
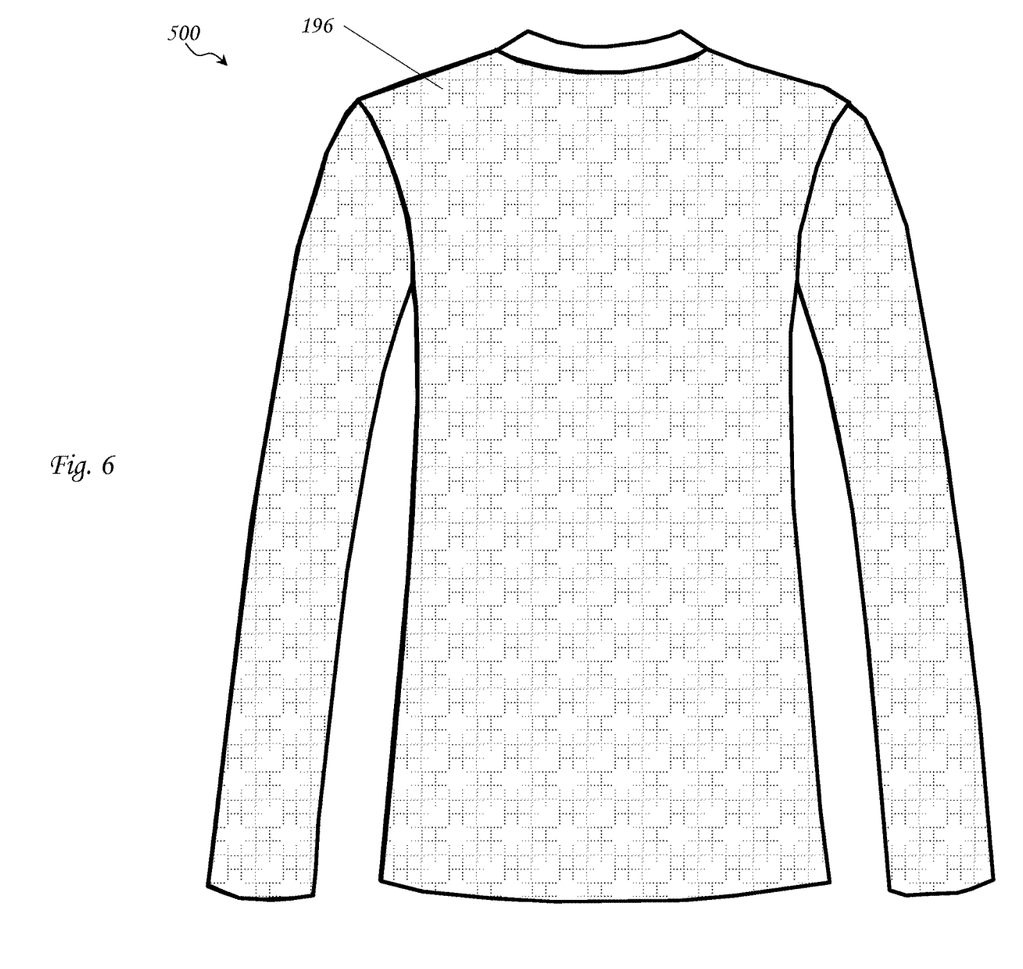
FIG. 6 is an exemplary diagram of a measuring shirt.

Referring now to exemplary FIGS. 5 and 6, an exemplary embodiment of a measuring shirt, such as measuring shirt 500 may be shown. Measuring shirt 500 may have a plurality of measurement markings that can be referred to generally as a front measuring grid 194 and a back measuring grid 196, which may allow a user to determine a plurality of desired measurements, for example quantified measurements of a torso length, a front chest, a back chest, an overarm, a shoulder, a bicep, a forearm, a stomach, a waist, a hip, a neck, a sleeve, and a wrist.

Figure 7:
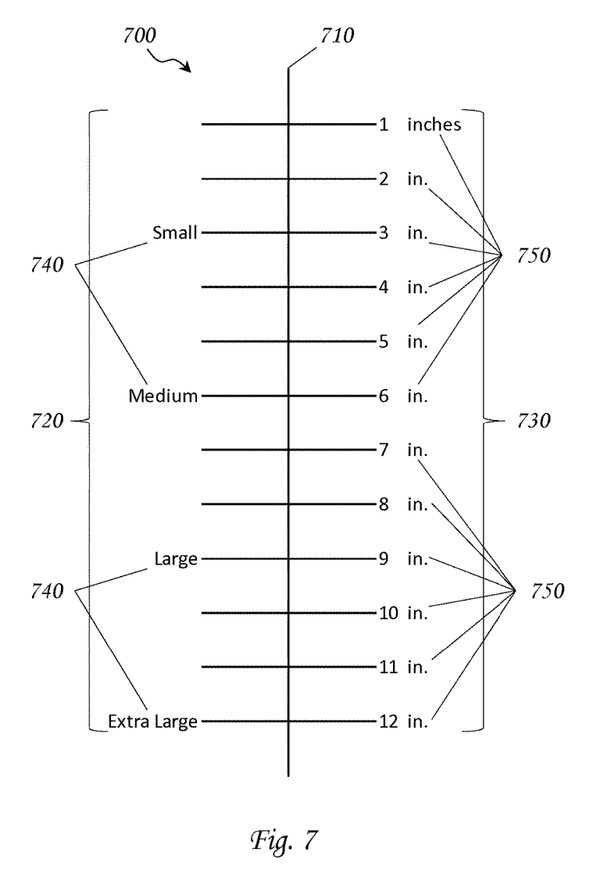
FIG. 7 is an exemplary diagram of a portion of a measuring shirt.
Figure 8:
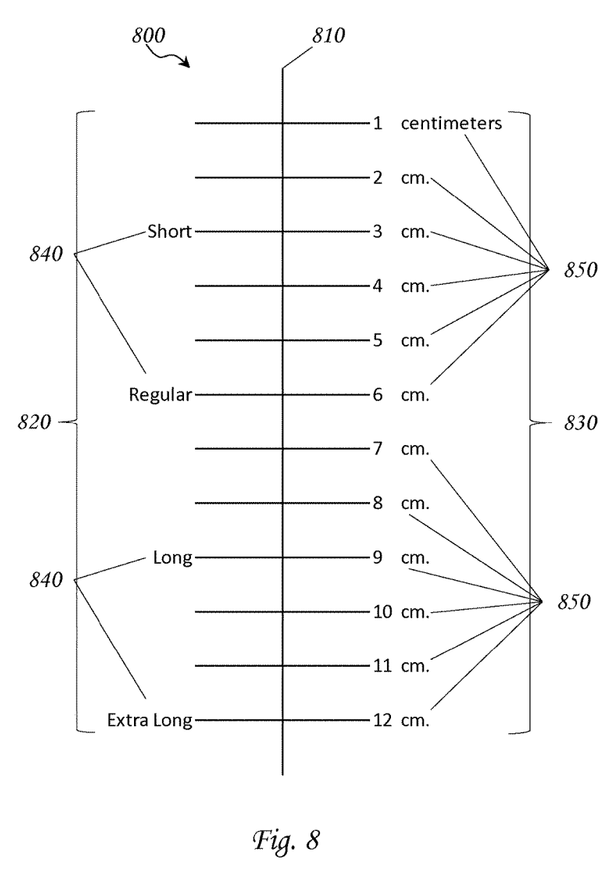
FIG. 8 is an exemplary diagram of a portion of a measuring shirt.

Referring now to exemplary FIGS. 7 and 8, exemplary embodiments of a measurement marking, such as measurement marking 700 or measurement marking 800, that may be included on a measuring shirt, such as measuring shirts 100, 300 or 500 may be shown. As shown in exemplary FIG. 7, measurement marking 700 may include at least a first ruler, for example one ruler 710, and at least hash mark set, for example two hash mark sets 720 and 730. Hash mark sets 720 and 730 may be aligned or staggered along ruler 710. Hash mark set 720 may have general labels 740 that indicated sizing categories, for example sizing categories of "small," "medium," "large," and "extra large." General labels 740 may also be written abbreviations or sizing categories written in a language other than English. Hash mark set 730 may have quantified labels 750 that indicate numerals corresponding to length along the ruler 710. Quantified labels 750 may relate to English units of measure, for example inches. Quantified labels 750 may alternatively relate to any unit of measure, standard or otherwise. As shown in exemplary FIG. 8, measurement marking 800 may include at least a first ruler, for example one ruler 810, and at least hash mark set, for example two hash mark sets 820 and 830. Hash mark sets 820 and 830 may be aligned or staggered along ruler 810. Hash mark set 820 may have general labels 840 that indicate sizing categories, for example sizing categories of "short," "regular," "long," and "extra long." General labels 840 may also be written abbreviations or sizing categories written in a language other than English. Hash mark set 830 may have quantified labels 850 that indicate numerals corresponding to length along the ruler 810. Quantified labels 850 may relate to metric units of measure, for example centimeters or millimeters. Quantified labels 750 may alternatively relate to any unit of measure, standard or otherwise. Other exemplary terms for use as general labels 740, 840 may include "fitted," "athletic," "traditional," "loose," and "baggy."

Figure 9:
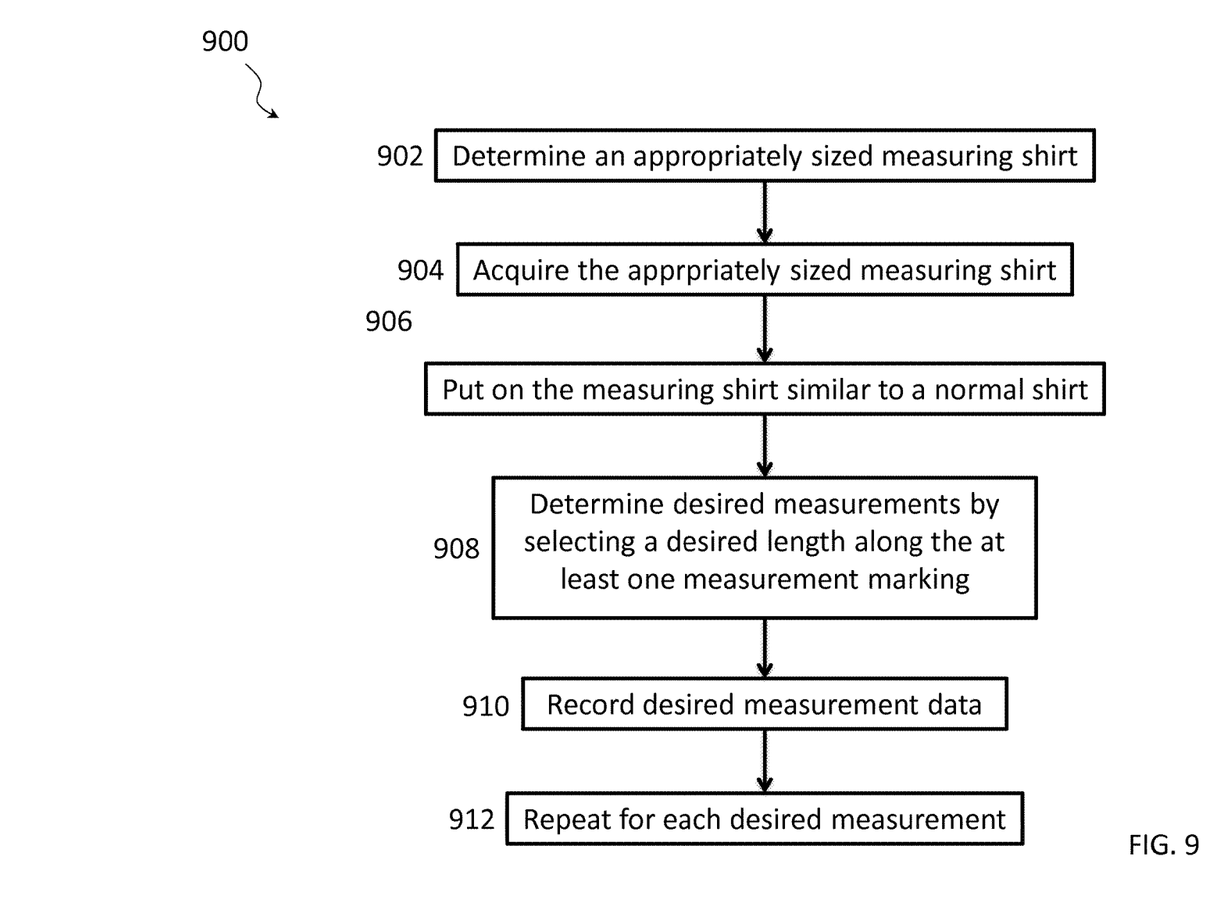
FIG. 9 is an exemplary flow chart of a shirt sizing process.

Referring to exemplary FIG. 9, a shirt sizing process 900 may be disclosed. In an exemplary embodiment having multiple size measuring shirts, a user may first determine an appropriate size measuring shirt 902. An appropriately sized measuring shirt may be determined through approximate measurements, a height and weight approximation scale, or through trying on different measuring shirts. A user may acquire an appropriately sized measuring shirt 904. Alternatively, in embodiments having a universal sized measuring shirt, a user may acquire such a universal sized measuring shirt. In step 906, the user may then put on the measuring shirt. In step 908, the user may individually or with the assistance of another determine desired measurements according to the scale of the measurement markings To do so, the user may choose a measurement to calculate first. For length measurements, the user may determine a desired length and select a point along the measurement marking in coordination with the desired length. In some embodiments, a user may close his or her eyes and point to where the user feels the garment should be hemmed. When the user opens his or her eyes, a measurement may be discernable from where the user is pointing. Alternatively, a user may perform the selection in a variety of ways, such as in front of a mirror. Measurements for horizontal, circumferential, or other measurements may be determined in a similar fashion. In step 910, the user may then utilize the scale of the measurement marking to record the desired measurement. Alternatively, the user may roll up or fold the measuring shirt to a desired length. The desired measurement may be determined by reading where the measurement marking intersects the fold or roll of the shirt. For circumferential measurements, a user may fold or pinch the shirt such that a desired measurement can be determined from the measurement marking The user may repeat the measurement process for each measurement until all desired measurements are recorded 912. The desired measurements may then be used to select a product or inform a tailor. For example, an online shopper may select a size when ordering based on the determined measurements.

Figure 10:
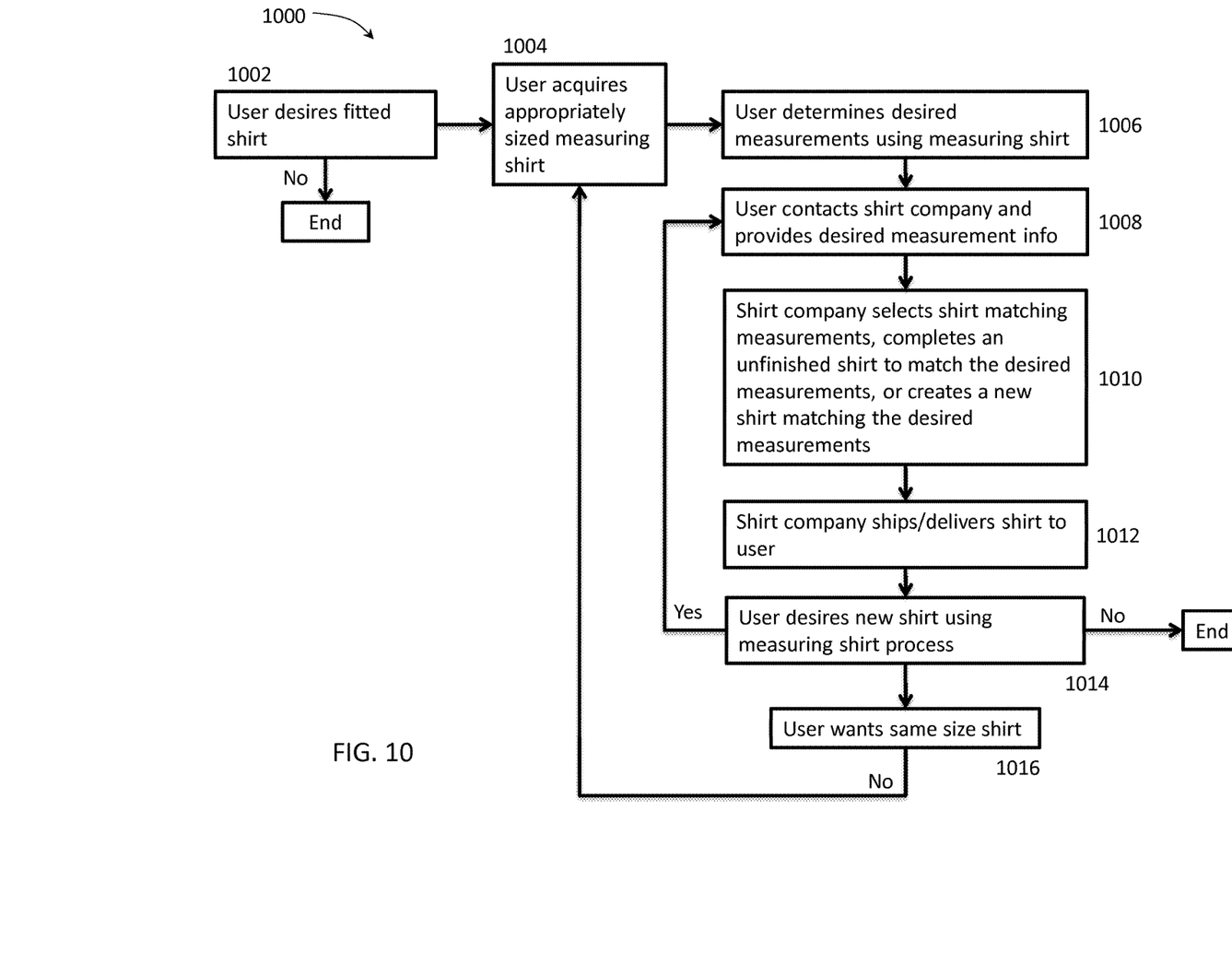
FIG. 10 is an exemplary flow chart of a process for obtaining a fitted shirt.

Referring to exemplary FIG. 10, a process for obtaining a custom tailored shirt 1000 may be disclosed. In an exemplary embodiment, the user may desire a custom fitted shirt 1002. It will be understood by a person having ordinary skill in the art that the process may be utilized for other types of garments. The user may acquire an appropriately sized measuring shirt 1004. The user may then utilize the measuring shirt to determine desired measurements as described above 1006. A garment manufacturer, distributor, or tailor may have the capability to process orders utilizing measurements from measuring shirts. In an exemplary embodiment, a user may access such a manufacturer, distributor, or tailor's website, the user may select a desired garment and the user may have the option of entering desired measurements from the measuring shirt 1008. The measurements may include quantified measurements or sizing categories. In alternatively exemplary embodiments, the user may place the order and convey the desired measurements over the phone, in person, or through other methods as would be understood by a person having ordinary skill in the art. In some embodiments, the manufacturer, distributor, or tailor may be the same as the producer of the measuring shirt utilized by the user, or may alternatively be certified by the producer of the utilized measuring shirt.

In step 1010, the manufacturer, distributor, or tailor may then process the order by selecting a finished garment matching the desired measurements or by selecting an unfinished garment and completing it to meet the desired measurements. The manufacturer, distributor, or tailor may alternatively tailor a completed garment or create a new garment to match the specified measurements. The process of completing the garment may be performed by a different entity from that which created an unfinished garment. The various steps of the process may also be completed in multiple countries or locales. In an exemplary embodiment, a stock of various shirts in several general sizes may be kept in inventory, but the torso length and sleeve length may be left unfinished. As orders come in utilizing measuring shirt measurements, these unfinished aspects may be completed to meet the user's desired specifications. Unfinished shirts may be configured to accommodate alterations based on any of the desired measurements calculated with the measuring shirt. In step 1012, the completed shirt or other garment may then be delivered to the user, as desired. In step 1014, if the user desires a similarly sized shirt, the process may repeat from 1008. In 1016, if the user desires a different shirt size, the process may repeat from step 1004 using a different measuring shirt or from step 1006 using different measurements. Alternatively, if a user desires a differently sized shirt, the user may recalculate the desired measurements on the same or a different measuring shirt. In embodiments utilizing multiple sizes of measuring shirts, the user may even recalculate the desired measurements on a differently sized measuring shirt.

In at least one exemplary embodiment, a shirt company may stock unfinished shirts in general sizes, such as small, medium, or large. An exemplary unfinished shirt may fit certain general measurement criteria, but may not have a finished torso length or sleeve length. The shirt company may provide measuring shirts in the general sizes with measurement markings for the unfinished aspects, such as the sleeve length and torso length. Alternatively, the general size may also be determined from the measuring shirt.

Figure 11:
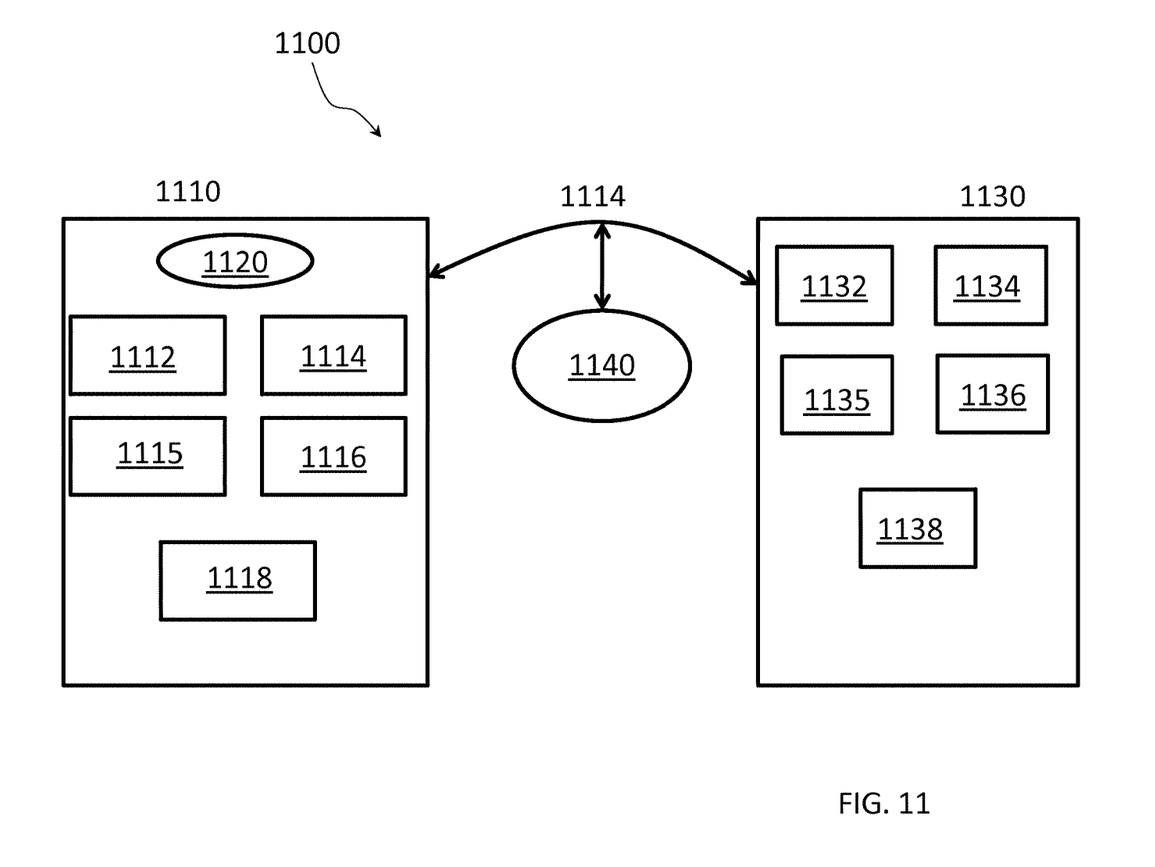
FIG. 11 is an exemplary diagram of a system for obtaining a fitted shirt.

A system for processing custom measurement garment orders 1100 may be disclosed. A software application may be provided to facilitate the garment ordering process for a user. The software application may be run on a user computer device 1110 configured to provide a graphical user interface and allow for user interaction with the graphical user interface through device components such as a display component 1114 or input component 118. An input component 1118 may include a touch screen, keyboard, mouse, or peripheral component as would be understood by a person having ordinary skill in the art. In an exemplary embodiment, a user device may be a mobile device. The user device may be configured to communicate over a network 1140 with a computer configured to process orders 1130 through communication interfaces 1115, 1135. The user may be able to view, select, and initiate an order of a garment through the software application. A user may be able to register and create a user profile for storing user information. The user profile data may be updated as desired. The user information may include measurements determined from the measuring shirt, as described above. The user profile data may be stored in a database accessible by the software application. In some exemplary embodiments, the user profile data may be stored in a memory component of the user device 1116, a memory component of the order processing computer 1136, or a remote server 1140. The user computer device may further include a processor 1112. The order processing computer may further include a processor 1132, a display component 1114, and an input component 1118. It will be understood by a person having ordinary skill in the art that, pursuant to paragraph 18 above, additional components may be utilized in system 1100, the user computer device 1110, and order processing computer 1130 to perform the described sequences.

In some exemplary embodiments, the user device may include a camera 1120 or may be communicatively coupled with a camera. In such embodiments, a user may enter measurement information by capturing measurement markings on a measuring shirt with the camera. For example, the measurement markings captured by the camera may be recognizable or readable by the software application, such as through the use of QR codes, digital watermarks or barcodes. The user measurement data may be automatically populated through the reading of measurement markings. Similarly a garment tag may include a barcode which can be captured through the user device camera and processed by the software application to order the garment with the user's desired measurements.

In an exemplary embodiment, a user may browse a selection of available garments through a website or the software application. The available garments may include unfinished garments. The user may select a desired garment for ordering. The stored user profile data may be utilized to provide the necessary measurements for the purveyor to custom size the garment. Alternatively, the user may be able to enter desired measurements during the ordering process. The user profile data may additionally include shipping, billing, and contact information. Once the user has completed an order, the order information may be processed by the purveyor's order processing computer. A shirt may be selected from the inventory and then it may be completed and shipped. Alternatively, a completely new garment may be fabricated based on the user measurement data. In some exemplary embodiments, the process may be automated such that the measurement data may be communicated by the order processing computer to an automated production device. The production device may be configured to receive measurement data and produce or complete a garment according to the measurement data.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A measuring shirt device comprising:
   a shirt having a torso portion, a right arm portion, a left arm portion, a neck portion, and a plurality of measurement markings forming a sole measurement index for measuring circumferential distance and/or a sole measurement index for measuring longitudinal distance, wherein the plurality of measurement markings are disposed on at least one of the torso portion, the right arm portion, the left arm portion, or the neck portion,
   wherein the measurement markings are one of a line running longitudinally and/or a line running circumferentially around a portion of the shirt, and
   wherein the measurement markings exclude further measurement indicators and the spacing relationship of the longitudinal measurement markings creates the sole measurement index for measuring a circumferential distance and the spacing relationship of the circumferential measurement markings creates the sole measurement index for measuring a longitudinal distance.

2. The measuring shirt of claim one, wherein the shirt includes measurement markings for at least one of a torso length, a left sleeve length, a right sleeve length, a neck size, a chest size, a waist size, a shoulder size, a bicep size, and a wrist size.

3. The measuring shirt of claim one, wherein the at least one measurement marking is a grid of lines running longitudinally and circumferentially about at least a portion of the shirt.

* * * * *